Figure 1:
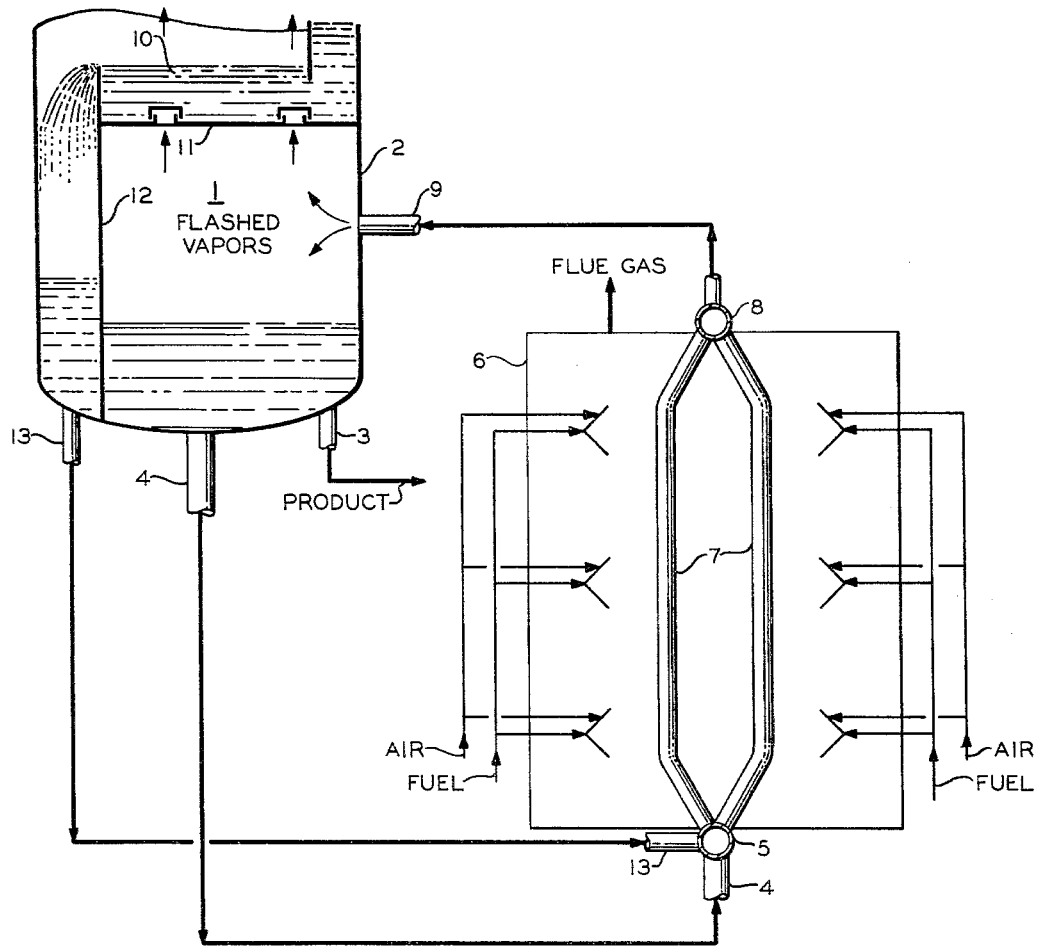
Figure 2:
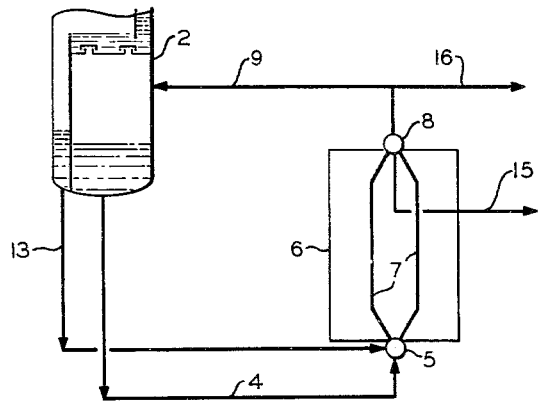

INVENTOR.
L. G. MOLIQUE
BY
Young & Quigg
ATTORNEYS

United States Patent Office 3,230,158
Patented Jan. 18, 1966

3,230,158
METHOD AND APPARATUS FOR REBOILING A HEATED SYSTEM
Lawrence G. Molique, Bartlesville, Okla., assignor to Phillips Petroleum Company, a corporation of Delaware
Filed Nov. 27, 1961, Ser. No. 155,102
14 Claims. (Cl. 203—98)

This invention relates to a method and to an apparatus for reboiling a heated system. In one of its aspects, the invention relates to a method of supplying heat to a system which requires heat and in which a heated liquid exists which comprises removing a portion of the heated liquid, heating the removed liquid in a vertically disposed elongated externally heated passageway, creating a thermo-siphon effect, and then returning the heated fluid to the system from whence it came. In another of its aspects, the invention relates to a method of withdrawing hot liquid near its bubble point from a fractionation system, heating said liquid in a vertically disposed elongated externally heated passageway and then returning the thus heated fluid to said fractionation system. In a further aspect of the invention, it relates to adding to the liquid removed from said fractionation system just prior to heating it in the vertically disposed externally heated passageway a portion of a somewhat cooler liquid from said fractionation system to cause some vaporization to take place as the combined liquids move upwardly into and through the vertically disposed externally heated passageway or zone. In a further aspect, the invention relates to a fractionation system having externally fired vertically disposed heating tubes, means for passing fractionator bottoms to a bottom portion of said tubes, means for passing a portion of a cooler liquid taken from the fractionation means above its bottoms also into said tubes and means for returning the mixed fluids when these have been heated in said tubes to the fractionation means.

The general application of this invention to the external heating of liquids which have been removed from a system and to which they are to be returned is now exemplified by reference to fractionating tower which is reboiled.

Conventionally, a fractionator tower has been reboiled by taking suction with a pump upon the tower bottoms, pumping these bottoms into a coil located in a furnace which externally heats the coil, and therein heating said bottoms and then returning the same to the fractionator tower. Thus conventionally reboiled systems which use a tube coil within a firebox to reboil a fractionator tower bottoms have required a pump to charge the fractionating tower bottoms stream to the heating coil. This pump has been a source of operating trouble. A trouble frequently encountered is that of losing suction. When the pump loses suction the furnace coil can "dry up" and, therefore, be destructively overheated. Difficulty in the provision of a suction head required to insure against loss of suction in a conventionally reboiled system has been encountered due to the fact that the liquid in the bottom of the tower is usually at its bubble point or very near to the same. Additionally, liquid overflowing from the bottom tray to the bottom of the tower is, relatively speaking, cold and contains material which will vaporize when mixed with the hotter liquid in the bottom of the tower. This vaporization, some of which takes place in the pump suction, causes loss of suction of the pump.

It has now been conceived by me that the objectionable features of the conventionally fired reboiler system employing a pump can be eliminated by providing substantially vertically disposed elongated heating tubes or zone into which there is fed the bottoms from the fractionator tower and wherein the bottoms are heated by heating said tubes externally, following which the heated bottoms are returned to the fractionator tower bottoms. Additionally, bottom tray liquid which is more volatile than the bottoms liquid is removed from the fractionator tower, without allowing the same to admix with bottoms and is admixed with bottoms just as these enter into the externally heated heating tubes. This admixture of the relatively cooler liquid with the fractionator tower bottoms causes vaporization to occur initiating a thermo-siphon effect in the vertically disposed tubes. This effect is, of course, increased as the mixture progresses upwardly through the tubes and is heated therein.

An object of this invention is to provide a method for supplying heat to a system. Another object of this invention is to provide an apparatus for supplying heat to a system. A further object of this invention is to provide a method for reboiling a fractionator or distillation tower bottoms without having to use a pump. A still further object of this invention is to provide a reboiler system wherein fractionator tower bottoms can be reboiled, said system being operative without the use of a pump.

Other aspects, objects and the several advantages of this invention are apparent from a study of this disclosure, the drawing and the appended claims.

According to the present invention, there are provided method and means for supplying from an external source heat to a system such as is involved in the external reboiling of a fractionator tower bottoms, the method comprising removing a portion of the tower bottoms, passing said portion into an externally fired or heated and vertically disposed elongated passageway, in said passageway heating said portion and returning the thus heated portion to said tower. Further, a relatively cooler more volatile portion, as from a tray above the fractionator tower bottom, of the liquid in said tower is passed into admixture with the first mentioned portion just about as it enters the substantially vertically disposed externally fired or heated passageway thereby causing vaporization within said passageway and thus aiding the thermo-siphon effect which is obtained according to the invention. Further, according to the invention the means which are provided comprise in combination means in which the liquid which is to be reboiled is contained, externally fired substantially vertically disposed heating tubes, means for passing a portion of liquid from the first means to a low portion of said tubes, means for heating said tubes, and means for passing heated fluid from within said tubes back to said first mentioned means. Further, means are provided for taking liquid which is relatively cooler from a portion near the first liquid taken and passing said liquid into admixture with the first liquid taken just as this first liquid taken enters the externally fired or heated tubes.

The attached schematic drawing further illustrates and describes the invention. In FIGURE I there is shown an embodiment of the invention as thus far described. In FIGURE II there is a modification in which the liquid yield rather than coming from a fractionator tower is taken from either the upper header of the fire heater and/or from the discharge therefrom.

Referring now to FIGURE I, bottoms 1 from a fractionator tower 2 are yielded by 3 to storage. A portion of the bottoms is taken by 4 to bottom header 5 of fired heater 6 containing tubes 7. The liquid entering header 5 subdivides and passes through tubes 7 and the heated fluid which has risen through tubes 7 is collected in header 8 and passed by 9 back to fractionator tower bottoms just above the level of liquid therein. Flashed vapors rise, as shown by the arrow, while unvaporized or residual liquid falls to the bottom. As a feature of a modification of the invention liquid 10 from a bottom tray 11 is passed by downcomer 12 and pipe 13 to header 5 for admixture in header 5 with the bottoms liquid entering by pipe 4. It will be noted that liquid from the bottom tray overflows into a separate compartment or downcomer 12 from which it also flows as do the bottoms 1 by gravity to bottom header 5. Mixing of the two liquid streams in the bottom header causes some of the bottom tray liquid to vaporize, thus instituting flow up the tubes to the top header. Further vaporization in the externally heated tubes will provide the differential density required to induce a high flow rate through the reboiler tubes 7.

Obviously, any heater or heating coil which lends itself to the establishment of the combination gas-lift and/or thermo-siphon effect obtained by this invention, as herein disclosed and described, can be employed.

Referring now to FIGURE II wherein like elements have received the same numbering as those of FIGURE I, it will be seen that the liquid yield which is yielded at 3 in FIGURE I is yielded at 15 in FIGURE II and/or at 16 in FIGURE II.

SPECIFIC EXAMPLE
(FIGURE I)

As applied to a deisobutanizer column as used in an HF alkylation system.

Stream 13:
    Temperature, ° F. .................. 183
    Bubble point, ° F. .................. 183
    Mols/hour ........................ 1,774
Stream 4:
    Temperature, ° F. .................. 245
    Bubble point, ° F. .................. 245
    Mols/hour ........................ 3,300
Stream 9:
    Temperature, ° F. .................. 245
    Vapor/liquid mol ratio ........... 0.3 to 1.0
    Mols/hour ........................ 5,074
Stream 3:
    Temperature, ° F. .................. 245
    Bubble point, ° F. .................. 245
    Mols/hour ........................ 259
Tower pressure, p.s.i.g. ............... 135

Reasonable variation and modification are possible within the scope of the foregoing disclosure, drawing, and the appended claims to the invention the essence of which is that a fractionator tower or other system bottoms are reboiled externally of the system, without the use of pumping means, by creating a gas-lift and/or thermo-siphon effect as described in means comprising essentially vertically disposed externally heated tubes or a coil lending itself to the establishment of such a gas-lift and/or thermo-siphon effect, in one particularly now preferred embodiment, the method and means comprising steps and apparatus for conveying liquid which is relatively cooler and which contains vaporizable constituents into admixture with the liquid to be heated just as it enters the heater or heated tubes or coil to cause vaporization and thereby to obtain a gas-lift effect as well as a thermo-siphon effect.

I claim:

1. A method for supplying heat to a system requiring the same and wherein a liquid is undergoing treatment involving the use of heat which comprises removing a portion of said liquid from a lower portion of said system, passing said liquid by gravity flow to the lower end of an externally heated heating zone in which a thermo-siphon effect can be imparted to said liquid, also removing from said system a relatively cooler second portion of liquid, which will form vapors when brought to the temperature of the first-mentioned portion of liquid, passing said relatively cooler second portion of liquid, which now has been removed from said system and which will form vapors when brought to the temperature of the first-mentioned portion of liquid, into admixture with said first-mentioned portion of liquid just as it is about to enter said heating zone, heating the liquid admixture thus obtained in said heating zone, thus imparting thereto a thermo-siphon effect due to the heating and a gas lift effect due to vapor formation due to heating of said second portion of liquid now in said admixture and returning the now thus heat-treated admixture to said treating zone.

2. A method for supplying heat to a fractionation zone requiring the same and wherein a first liquid is undergoing treatment involving the use of heat which comprises providing in a lower portion of said fractionation zone a first section to receive and to contain heated bottoms, also providing in the lower portion of said fractionation zone but above said first section a second section adapted to contain and to yield a second liquid, also providing at the lower portion of said fractionation zone a withdrawal of said second liquid from said section entirely out of direct contact with the liquid contents of said first section, passing liquid from said second section out of contact with the liquid contents of said first section, by gravity flow, to the lower end of an externally heated heating zone in which a thermo-siphon effect can be imparted to said liquid, heating said liquid in said heating zone and passing the same upwardly therethrough by thermo-siphon effect and then passing thus heated liquid into said first section, in said first section separating the thus heat-treated liquid into vapors and a bottoms liquid, passing a portion of said bottoms liquid into admixture with said liquid as it is about to enter said lower end of said heating zone, and removing another portion of said bottoms as product.

3. A method according to claim 2 wherein said second section above said first section is a bottom tray above the first section which is the section which collects bottoms in said fractionation zone.

4. A method according to claim 2 wherein the portion of bottoms removed as product is removed from heated liquid after it has been heated in said heating zone and before the heated liquid is returned to said first section.

5. A method according to claim 2 wherein the externally heated heating zone is composed of at least two passageways which are heated along their lengths and which are connected in parallel in open communication with each other at their ends and wherein the liquid from said second section and the portion of said bottoms liquid which are passed into admixture are passed into admixture substantially at the connection of said passageways at their lower ends.

6. A method according to claim 5 wherein the portion of bottoms removed as product is removed from the connection of said passageways at their upper ends.

7. A method according to claim 5 wherein the heated liquid admixture after passing through the connection of the passageways at their upper ends is subdivided into at least two portions, one of which is passed to said first section and the other of which is removed as product.

8. A method according to claim 2 wherein said heating zone is substantially vertically disposed.

9. A method according to claim 8 wherein the bottom ends of said passageways are connected together in open communication and the top ends of said passageways are connected together in open communication, and wherein the top ends connection is made by way of a header zone.

10. A method according to claim 9 wherein a product removal zone is provided at a low point of said header zone and liquid lean in entrained vapors is removed from said header zone.

11. A reboiler means for use with a fractionation system comprising, in combination, a fractionation vessel, a substantially vertically disposed elongated heated passageway situated at a level relative to said vessel such that heavy ends from said vessel will flow by gravity to the low end of said passageway and from its upper end by thermo-siphon effect to said vessel, means for conducting heavy ends liquid from said vessel to said passageway, means for conducting heated liquid emerging from the upper end of said passageway to said vessel, means for heating said passageway, and means for conducting removing and passing relatively cool liquid from a cooler section of said vessel above said heavy ends in said vessel, to and into admixture with heavy ends liquid just as said heavy ends liquid is about to enter the lower end of said passageway.

12. Apparatus in combination with a fractionation vessel comprising an externally heated heating means located externally of said vessel at a position such that liquid from a heavy ends portion of said vessel can flow to the bottom of said heating means by gravity flow, means to convey liquid from said portion of said vessel to the bottom of said heating means, means in said heating means for heating liquid therein and to cause a thermo-siphon effect therein, means to convey liquid from a cooler portion of said vessel out of direct contact with heavy ends liquid, said liquid being at a lower temperature than liquid from said heavy ends portion of said vessel, to a point at the lower end of said heating means for admixture with said liquid from said heavy ends portion as it is about to enter said heating means, and means connecting said heating means and said vessel to return heated liquid to said vessel by said thermo-siphon effect alone.

13. Apparatus according to claim 12 wherein the heating means is substantially vertically disposed and is composed of a plurality of passageways providing for parallel flow by being connected in open communication by way of a header respectively at their bottom ends and their top ends and wherein means are provided for removal of liquid as product from a lower portion of the header connecting the top ends of said passageways.

14. Apparatus according to claim 12 wherein the heating means is substantially vertically disposed and is composed of a plurality of passageways providing for parallel flow by being connected in open communication by way of a header respectively at their bottom ends and their top ends and wherein means are provided for removal of heated liquid as product from the means connecting said heating means and said vessel.

References Cited by the Examiner

UNITED STATES PATENTS

| | | | |
|---|---|---|---|
| 2,534,173 | 12/1950 | Kraft. | |
| 2,795,536 | 6/1957 | Grossberg et al. | 202—70 X |
| 2,849,386 | 8/1958 | Gilmore et al. | 202—153 |

NORMAN YUDKOFF, *Primary Examiner.*